US009019265B2

(12) United States Patent
Yonezu

(10) Patent No.: US 9,019,265 B2
(45) Date of Patent: Apr. 28, 2015

(54) STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(75) Inventor: Makoto Yonezu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 385 days.

(21) Appl. No.: 13/556,459

(22) Filed: Jul. 24, 2012

(65) Prior Publication Data
US 2013/0215105 A1    Aug. 22, 2013

(30) Foreign Application Priority Data

Feb. 17, 2012    (JP) .................................. 2012-032338

(51) Int. Cl.
G06T 15/00    (2011.01)
H04N 13/00    (2006.01)
G06T 15/10    (2011.01)
H04N 13/02    (2006.01)

(52) U.S. Cl.
CPC ............ H04N 13/0018 (2013.01); G06T 15/10 (2013.01); H04N 13/0275 (2013.01)

(58) Field of Classification Search
CPC ................... G09G 3/003; G06T 15/00–15/87; G06T 19/00–19/20; G06T 2207/10012; H04N 13/0018
USPC ................................................... 345/419–427
See application file for complete search history.

(56) References Cited

U.S. PATENT DOCUMENTS

| 6,201,517 | B1 * | 3/2001 | Sato .................................. 345/7 |
| 6,803,912 | B1 * | 10/2004 | Mark et al. .................... 345/427 |
| 7,092,003 | B1 * | 8/2006 | Siegel et al. ..................... 348/47 |
| 8,405,708 | B2 * | 3/2013 | Robinson et al. ............... 348/42 |
| 8,599,245 | B2 * | 12/2013 | Misawa ........................... 348/47 |
| 2010/0289819 | A1 * | 11/2010 | Singh et al. ................... 345/619 |
| 2011/0304707 | A1 | 12/2011 | Oyagi |
| 2012/0105444 | A1 * | 5/2012 | Tokuda ......................... 345/419 |
| 2013/0051660 | A1 | 2/2013 | Shibuhisa et al. |

FOREIGN PATENT DOCUMENTS

| JP | 2002-183753 | 6/2002 |
| JP | 2004-221700 | 8/2004 |
| JP | 2011-250059 | 12/2011 |
| JP | 2011-257682 | 12/2011 |

* cited by examiner

Primary Examiner — Charles Tseng
(74) Attorney, Agent, or Firm — Nixon & Vanderhye, P.C.

(57) ABSTRACT

A parallax with which a virtual world is stereoscopically displayed is set, and in accordance with the parallax, a level of blurring with which the virtual world is stereoscopically displayed is set. Then, a stereoscopic image in which the virtual world is stereoscopically displayed is generated on the basis of the parallax by blurring at least part of the virtual world in accordance with the level of blurring.

23 Claims, 10 Drawing Sheets

F I G. 2
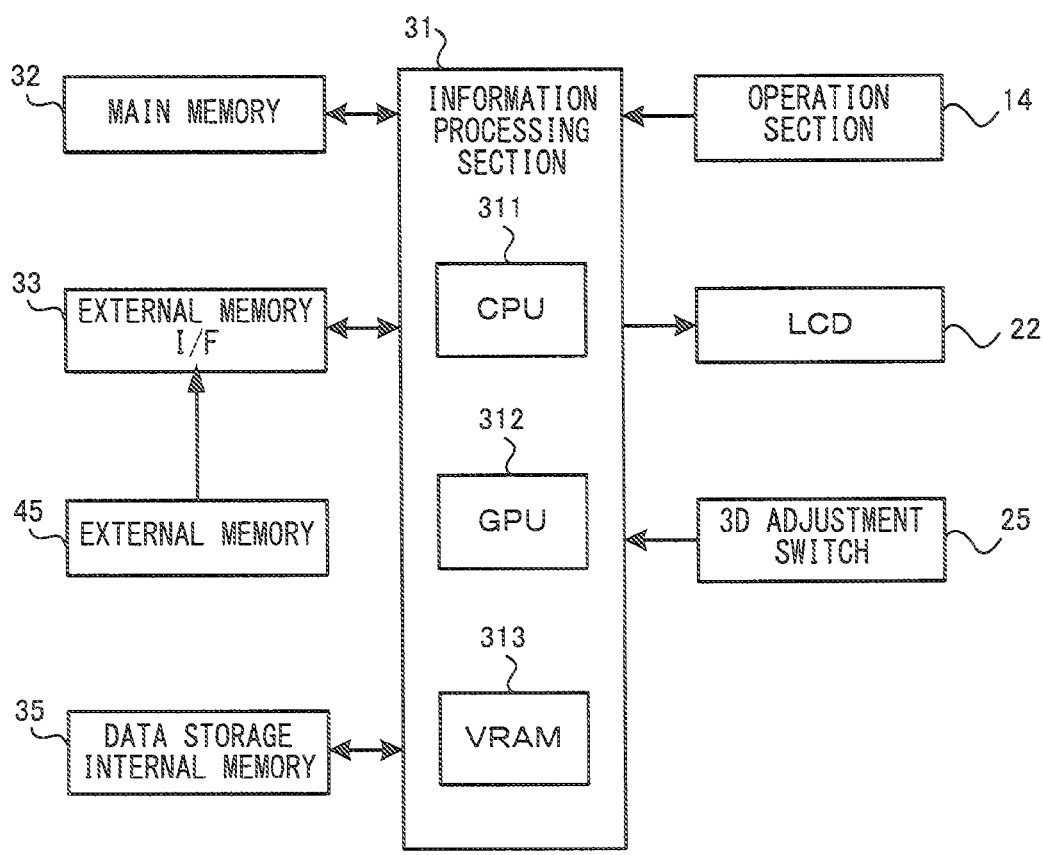

STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

The disclosure of Japanese Patent Application No. 2012-32338, filed on Feb. 17, 2012, is incorporated herein by reference.

FIELD

The technique shown here relates to a storage medium having stored therein a display control program, a display control apparatus, a display control system, and a display control method, and in particular, relates to a storage medium having stored therein a display control program that outputs a stereoscopically viewable image, and a display control apparatus, a display control system, and a display control method that output a stereoscopically viewable image.

BACKGROUND AND SUMMARY

Conventionally, a method is known of displaying a stereoscopically viewable image using an image having a predetermined parallax. The method creates, as a left-eye image and a right-eye image, images of a virtual space viewed from a left virtual camera and a right virtual camera placed in the virtual space so as to be separate from each other at a predetermined distance in a left-right direction. Then, the method displays the created left-eye image and right-eye image on a display apparatus, and thereby displays a stereoscopically viewable image on the display apparatus.

Here, generally, to display a stereoscopic image on a display apparatus capable of performing stereoscopic display, it is necessary to generate a left-eye image and a right-eye image so as to have a parallax. In the left-eye image and the right-eye image, however, even a change in the parallax or the adjustment of the parallax does not change parameters other than the parallax. Thus, even if images having different parallaxes are displayed, it is difficult to perform three-dimensional display so as to provide a feeling that the senses of perspective in the images differ significantly.

Therefore, it is a main object of an exemplary embodiment to provide a storage medium having stored therein a display control program that, when displaying a predetermined virtual world on a display apparatus capable of performing stereoscopic display, can further emphasize the sense of perspective in the virtual world, and a display control apparatus, a display control method, and a display control system that, when displaying a predetermined virtual world on a display apparatus capable of performing stereoscopic display, can further emphasize the sense of perspective in the virtual world.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a computer-readable storage medium having stored therein a display control program according to the exemplary embodiment, the display control program is executed by a computer of a display control apparatus for displaying a predetermined virtual world on a display apparatus capable of performing stereoscopic display, and the display control program causes the computer to execute: setting a parallax with which the virtual world is stereoscopically displayed; setting, in accordance with the parallax, a level of blurring with which the virtual world is stereoscopically displayed; and generating, on the basis of the parallax, a stereoscopic image in which the virtual world is stereoscopically displayed, by blurring at least part of the virtual world in accordance with the level of blurring.

On the basis of the above, it is possible to display at least part of a virtual world to be stereoscopically displayed, so as to be blurred in accordance with a level of blurring set in accordance with a parallax. This makes it possible to, when displaying a stereoscopic image, further emphasize the sense of perspective in the stereoscopic image.

In addition, the parallax with which the virtual world is stereoscopically displayed may be allowed to be changed without changing a position of an object in the virtual world. In this case, the level of blurring may be set by changing the level of blurring in accordance with the changed parallax.

On the basis of the above, the level of blurring is adjusted in conjunction with a change in the parallax, whereby the state of blurring of at least part of the virtual world changes with the position of an object in the virtual world being unchanged. This makes it possible to display an image in which the sense of perspective is further emphasized.

In addition, in accordance with the parallax set for a partial region of the virtual world, the level of blurring with which the partial region is displayed may be set. The stereoscopic image may be generated on the basis of the parallax by blurring the partial region in accordance with the level of blurring.

On the basis of the above, it is possible to display a partial region of the virtual world to be stereoscopically displayed, by changing the level of blurring of the partial region in accordance with the parallax set for the partial region. This makes it possible to, when displaying a stereoscopic image, further emphasize the sense of perspective in the stereoscopic image.

In addition, at least one object included in the virtual world may be used as the partial region, and the level of blurring with which the object is displayed may be set in accordance with the parallax set for the object. The stereoscopic image may be generated on the basis of the parallax by blurring the object with which the level of blurring has been set, in accordance with the set level of blurring.

On the basis of the above, it is possible to display at least one object to be stereoscopically displayed, by changing the level of blurring of the object in accordance with the parallax of the object. This makes it possible to, when displaying a stereoscopic image, further emphasize the sense of perspective in the stereoscopic image.

In addition, the display control program may further cause the computer to execute acquiring an output from a parallax adjustment mechanism for, in accordance with a user operation, adjusting a parallax with which the stereoscopic image is displayed on the display apparatus. In this case, the parallax with which the virtual world is stereoscopically displayed may be changed in accordance with the output from the parallax adjustment mechanism. The level of blurring may be set by changing the level of blurring in accordance with the parallax changed in accordance with the output from the parallax adjustment mechanism.

On the basis of the above, the level of blurring is adjusted in conjunction with the parallax adjustment made by a parallax adjustment mechanism, whereby it is possible to obtain a feeling as if adjusting a stereoscopic effect by further increasing and decreasing it using the parallax adjustment mechanism. This makes it possible to display an image in which the sense of perspective is further emphasized.

In addition, the level of blurring may be set by changing the level of blurring so as to have a linear relationship with a change in the parallax.

On the basis of the above, the level of blurring is linearly adjusted in conjunction with a change in the parallax. This makes it possible to realistically obtain a feeling as if the state of blurring is adjusted on the basis of the change in the parallax.

In addition, the stereoscopic image may be generated on the basis of the parallax by combining a first image and a second image together to blur the combined image, the first image unblurred or blurred in at least part thereof to a relatively small degree, the second image blurred in at least part thereof to a relatively large degree.

On the basis of the above, it is possible to generate an image represented so as to be blurred, only by combining a first image and a second image together. This eliminates the need of the process of generating an image by sequentially performing a blurring process on the virtual world.

In addition, the stereoscopic image may be generated on the basis of the parallax by combining the first image and the second image together in a blending ratio based on the level of blurring to blur the combined image.

On the basis of the above, it is possible to create images having various levels of blurring by combining the first image and the second image together while changing the blending ratio of the first image and the second image.

In addition, an image brighter than the first image may be used as the second image.

On the basis of the above, it is possible to represent a blurred image more realistically.

In addition, the stereoscopic image may be generated on the basis of the parallax by combining a first image and a second image together to blur the combined image, the first image unblurred relative to the object with which the level of blurring has been set, or blurred relative to at least part of the object to a relatively small degree, the second image blurred relative to the at least part of the object to a relatively large degree.

On the basis of the above, it is possible to, in accordance with the level of blurring, generate an image in which part of the object is blurred.

In addition, a third image may be further used that is blurred in at least part thereof in a different manner from the blurring of the second image and blurred in the at least part thereof to a larger degree than the blurring of the first image, and the second image or the third image is, in accordance with the level of blurring, selected to be combined with the first image.

On the basis of the above, it is possible to generate images having various states of blurring.

In addition, the level of blurring with which the partial region is displayed may be set using as the partial region a portion displayed in the virtual world at a position further in a depth direction than a reference depth position where no parallax is produced when the virtual world is stereoscopically displayed. The stereoscopic image may be generated on the basis of the parallax by blurring the partial region with which the level of blurring has been set, in accordance with the set level of blurring.

On the basis of the above, a stereoscopic image is displayed such that the partial region that appears to be displayed further in the depth direction than a screen is blurred in accordance with the parallax. This enhances the difference in the state of blurring between the partial region and an image that appears to be displayed near the screen, which makes it possible to emphasize the sense of perspective in the stereoscopic image.

In addition, the level of blurring with which the partial region may be displayed is set using as the partial region a portion to be displayed at the furthest position in the depth direction from the reference depth position when the virtual world is stereoscopically displayed.

On the basis of the above, a stereoscopic image is displayed such that a portion that appears to be displayed at the furthest position from the screen in the depth direction is blurred in accordance with the parallax. This enhances the difference in the state of blurring between an image that appears to be displayed near the screen and an image that appears to be displayed at the furthest position from the screen in the depth direction, which makes it possible to emphasize the sense of perspective in the stereoscopic image.

In addition, the level of blurring may be set for an image to be displayed in the virtual world at a position further in a depth direction than a display screen of the display apparatus when the virtual world is stereoscopically displayed on the display apparatus. The stereoscopic image may be generated on the basis of the parallax by blurring the image to be displayed at the position further in the depth direction, in accordance with the set level of blurring.

On the basis of the above, a stereoscopic image is displayed such that a portion that appears to be displayed at a position relatively far from the screen in the depth direction is blurred in accordance with the parallax. This enhances the difference in the state of blurring between an image that appears to be displayed at the relatively far position and other images, which makes it possible to emphasize the sense of perspective in the stereoscopic image.

In addition, the level of blurring with which the partial region is displayed may be set using as the partial region a portion to be displayed in the virtual world at a position closer in a depth direction than a reference depth position where no parallax is produced when the virtual world is stereoscopically displayed. The stereoscopic image may be generated on the basis of the parallax by blurring the partial region with which the level of blurring has been set, in accordance with the set level of blurring.

On the basis of the above, a stereoscopic image is displayed such that the partial region that appears to be displayed at a position closer than a screen in the depth direction is blurred in accordance with the parallax. This enhances the difference in the state of blurring between the partial region and an image that appears to be displayed near the screen, which makes it possible to emphasize the sense of perspective in the stereoscopic image.

In addition, the display control program may further cause the computer to execute placing objects on surfaces arranged at different depth distances in a depth direction in the virtual world. In this case, in accordance with the parallax set for an entirety of the object placed on the surface arranged at a predetermined depth distance among the depth distances, the level of blurring with which the object placed on the surface arranged at the predetermined depth distance is displayed may be set.

On the basis of the above, virtual objects are placed in the virtual world on surfaces (for example, planes) arranged at different depth distances, whereby it is possible to easily display as a stereoscopic image the virtual world where a plurality of objects are placed on different surfaces, and to display the object placed on at least one of the different surfaces, by blurring the entirety of the object in accordance with the parallax.

In addition, the entirety of the object placed on the surface arranged at the predetermined depth distance may be placed as one two-dimensional image perpendicular to the depth direction. A two-dimensional image in which the object is blurred may be generated by combining together a plurality of the two-dimensional images in which the object is represented so as to be blurred in different manners, and the stereoscopic image may be generated by placing the two-dimensional image including the blurred object on the basis of the parallax.

On the basis of the above, when an object is represented as a two-dimensional image, the two-dimensional images represented so as to be blurred in different manners are combined together. This makes it possible to easily generate an image in which the object is blurred.

In addition, the exemplary embodiment may be carried out in the forms of a display control apparatus and a display control system that include units for performing the above processes, and a display control method including the above operations.

The exemplary embodiment makes it possible to display at least part of a virtual world to be stereoscopically displayed, so as to be blurred in accordance with a level of blurring set in accordance with a parallax. This makes it possible to, when displaying a stereoscopic image, further emphasize the sense of perspective in the stereoscopic image.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 2 is a block diagram showing a non-limiting example of the internal configuration of the game apparatus 10;

DETAILED DESCRIPTION OF NON-LIMITING EXAMPLE EMBODIMENTS

Figure 1:
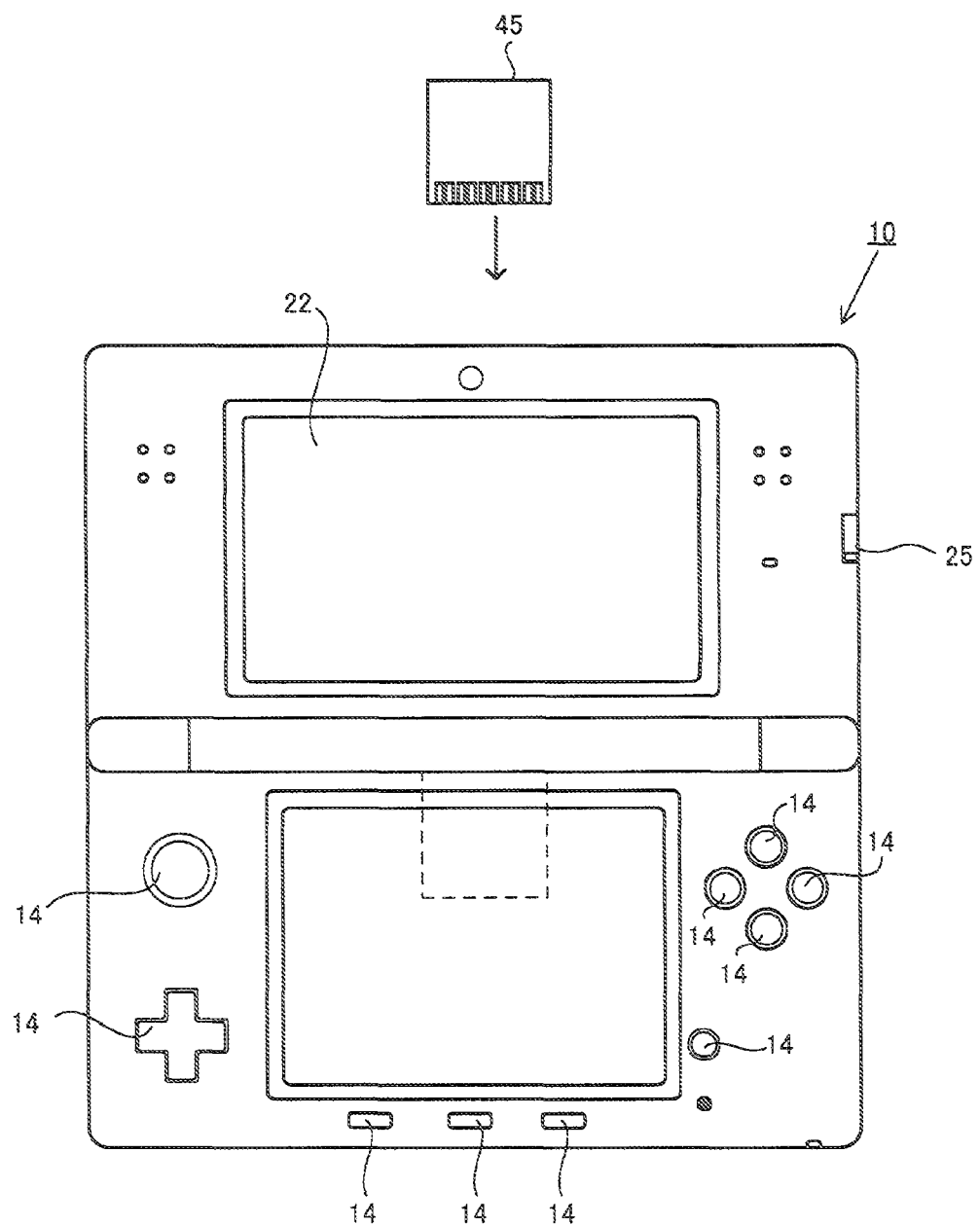
FIG. 1 is a front elevation showing a non-limiting example of a game apparatus 10.

With reference to the drawings, a description is given of a display control apparatus that executes a display control program according to an exemplary embodiment. While the display control program according to the exemplary embodiment can be applied by being executed by any computer system, a handheld game apparatus 10 is taken as an example of the display control apparatus, so that the description is given using a display control program to be executed by the game apparatus 10. It should be noted that FIG. 1 is a plan view showing an example of the external appearance of the game apparatus 10. The game apparatus 10 can execute a game program, and display on a screen an image generated using computer graphics processing, such as an image of a virtual space viewed from a virtual camera set in the virtual space.

In FIG. 1, the game apparatus 10 includes an insertion slot (shown by a dashed line in FIG. 1) for inserting an external memory 45 having stored therein a game program. Within the insertion slot, a connector (not shown) is provided for a detachable electrical connection with the external memory 45. The connection of the external memory 45 to the game apparatus 10 results in the execution of a predetermined game program.

The game apparatus 10 includes an LCD (Liquid Crystal Display) 22 and a 3D adjustment switch 25. It should be noted that the LCD 22 is a liquid crystal display here, but may be, for example, a display apparatus employing EL. These components are described in detail below.

The LCD 22 is a display apparatus capable of displaying a stereoscopically viewable image. The LCD 22 can display a left-eye image and a right-eye image using substantially the same display area. Specifically, the LCD 22 is a display apparatus that displays a left-eye image and a right-eye image alternately in a transverse direction in predetermined units (for example, on a column-by-column basis), and, for example, allows autostereoscopic viewing. As an example, the LCD 22 employs a parallax bather method or a lenticular method so that the left-eye image and the right-eye image displayed alternately in the transverse direction are separately visible to the left eye and the right eye. In the case of the parallax barrier method, the LCD 22 allows a user to view the left-eye image with the left eye and the right-eye image with the right eye, using a parallax barrier, and thereby can display a three-dimensional image that gives the user a stereoscopic effect (a stereoscopically viewable image). Further, the LCD 22 can disable the parallax barrier, in which case the LCD 22 can display an image in a planar manner (the LCD 22 can display an image that is planar, as opposed to the term "stereoscopic" described above; this is, in other words, a display mode where the same displayed image is visible to both the left eye and the right eye). As described above, the LCD 22 is a display apparatus capable of switching between: a three-dimensional display mode where a stereoscopically viewable image is displayed; and a planar display mode where an image is displayed in a planar manner (a planar image is displayed). It is possible to switch the display mode and adjust the parallax using the 3D adjustment switch 25 described later. It should be noted that the LCD 22 does not need to be a display apparatus that allows autostereoscopic viewing, and may be configured to allow stereoscopic viewing by another method. For example, the LCD 22 may be configured to allow stereoscopic viewing by a polarizing filter method, a frame-sequential method, an anaglyph method, or the like.

The 3D adjustment switch 25 is a slide switch. The 3D adjustment switch 25 is a switch used to switch the display mode of the LCD 22 as described above. The 3D adjustment switch 25 is also used to adjust the stereoscopic effect of and the sense of perspective in (the parallax, a position for the depth of field (the focus), and the like of) the stereoscopically viewable image (the three-dimensional image) displayed on the LCD 22. The 3D adjustment switch 25 has a slider that is slidable to any position in a predetermined direction (for example, an up-down direction), so that the display mode of the LCD 22 is set in accordance with the position of the slider. The appearance of the three-dimensional image is also adjusted in accordance with the position of the slider. Specifically, in accordance with the position of the slider, the amount of shift (the parallax) in transverse position between the right-eye image and the left-eye image is adjusted, while the blurred representation (the depth of field and the focus) of an image displayed so as to be placed at a predetermined distance in a depth direction is also adjusted. As described above, on the basis of the position of its slider, the 3D adjustment switch 25 can switch the display mode, and adjust the parallax and the blurred representation of a displayed image when stereoscopically displayed.

Next, with reference to FIG. 2, the internal configuration of the game apparatus 10 is described. It should be noted that FIG. 2 is a block diagram showing an example of the internal configuration of the game apparatus 10.

In FIG. 2, the game apparatus 10 includes electronic components such as an information processing section 31, a main memory 32, an external memory interface (external memory I/F) 33, and a data storage internal memory 35, in addition to the components described above. These electronic components are implemented on an electronic circuit board and accommodated in a housing.

The information processing section 31 is information processing means including a CPU (Central Processing Unit) 311 that executes a predetermined program, a GPU (Graphics Processing Unit) 312 that performs image processing, and the like. In the exemplary embodiment, a predetermined program is stored in a memory (for example, an external memory 45 connected to the external memory I/F 33 or the data storage internal memory 35) included in the game apparatus 10. The CPU 311 of the information processing section 31 executes the predetermined program, and thereby performs image processing and game processing described later. It should be noted that a program to be executed by the CPU 311 of the information processing section 31 may be acquired from another apparatus by communication with said another apparatus. The information processing section 31 also includes a VRAM (Video RAM) 313. The GPU 312 of the information processing section 31 generates an image in accordance with a command from the CPU 311 of the information processing section 31, and draws the generated image in the VRAM 313. Then, the GPU 312 of the information processing section 31 outputs the image drawn in the VRAM 313 to the LCD 22. This causes the image to be displayed on the LCD 22.

The information processing section 31 is connected to the main memory 32, the external memory I/F 33, and the data storage internal memory 35. The external memory I/F 33 is an interface for detachably connecting the external memory 45 to the game apparatus 10.

The main memory 32 is volatile storage means used as a work area and a buffer area of the information processing section 31 (the CPU 311). That is, the main memory 32 temporarily stores various data used in the image processing and the game processing, and temporarily stores a program acquired from outside the game apparatus 10 (from the external memory 45, another apparatus, or the like).

The external memory 45 is non-volatile storage means for storing a program to be executed by the information processing section 31. The external memory 45 is composed, for example, of a read-only semiconductor memory. The connection of the external memory 45 to the external memory I/F 33 enables the information processing section 31 to load a program stored in the external memory 45. The execution of the program loaded by the information processing section 31 results in performing predetermined processing.

The data storage internal memory 35 is composed of a readable and writable non-volatile memory (for example, a NAND flash memory), and is used to store predetermined data. For example, the data storage internal memory 35 has stored therein data and programs obtained by pre-installing them or by downloading them via wireless communication.

The operation section 14 is connected to the information processing section 31. The operation section 14 outputs, to the information processing section 31, operation data representing the state of the input to the operation section 14 (whether or not the operation section 14 has been pressed). The information processing section 31 acquires the operation data from the operation section 14, and thereby performs the processing based on the input to the operation section 14.

The LCD 22 is connected to the information processing section 31. The LCD 22 displays an image in accordance with an instruction from the information processing section 31 (the GPU 312). In the exemplary embodiment, the information processing section 31 causes a three-dimensional image using a right-eye image and a left-eye image (a stereoscopically viewable image) to be displayed on the LCD 22, and causes a planar image having no parallax to be displayed the LCD 22.

The 3D adjustment switch 25 is connected to the information processing section 31. The 3D adjustment switch 25 transmits to the information processing section 31 an electrical signal based on the position of the slider.

Figure 3:
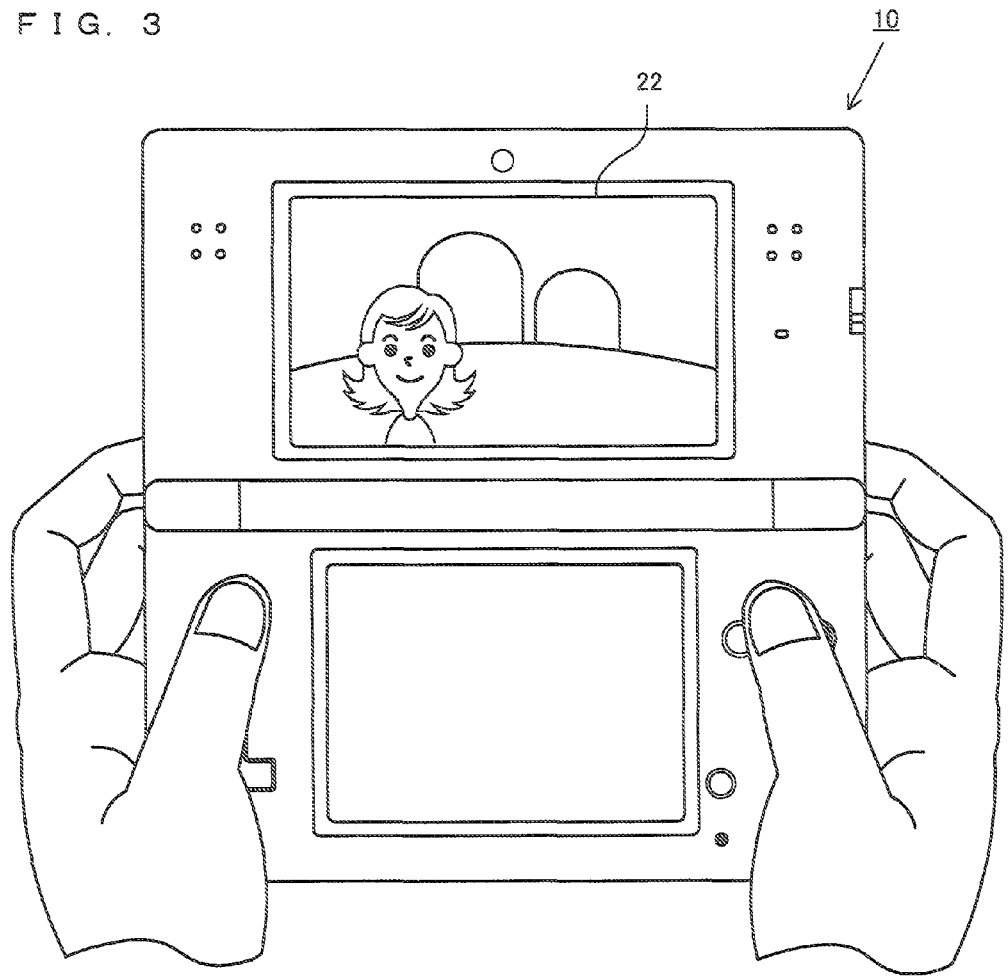
FIG. 3 is a diagram showing a non-limiting example of the state of a user holding the game apparatus 10 with both hands.
Figure 4:
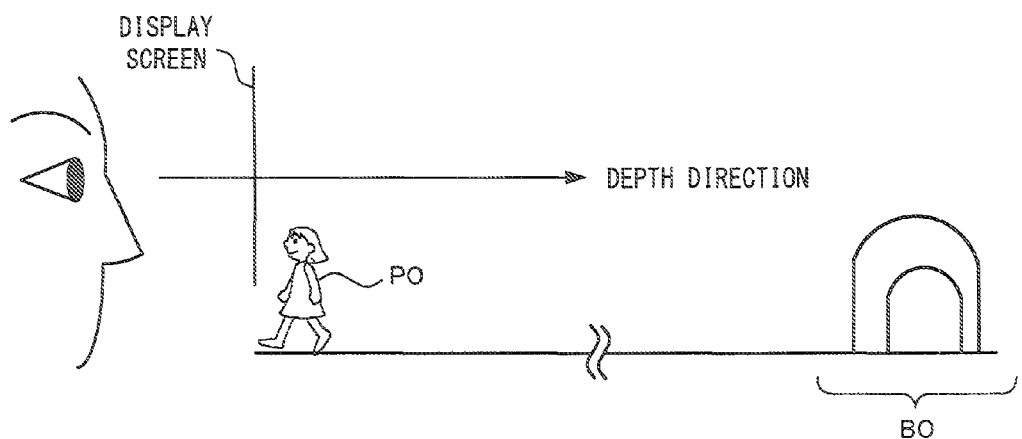
FIG. 4 is a conceptual diagram showing a non-limiting example of the state of a stereoscopic image displayed on an LCD 22.
Figure 5:
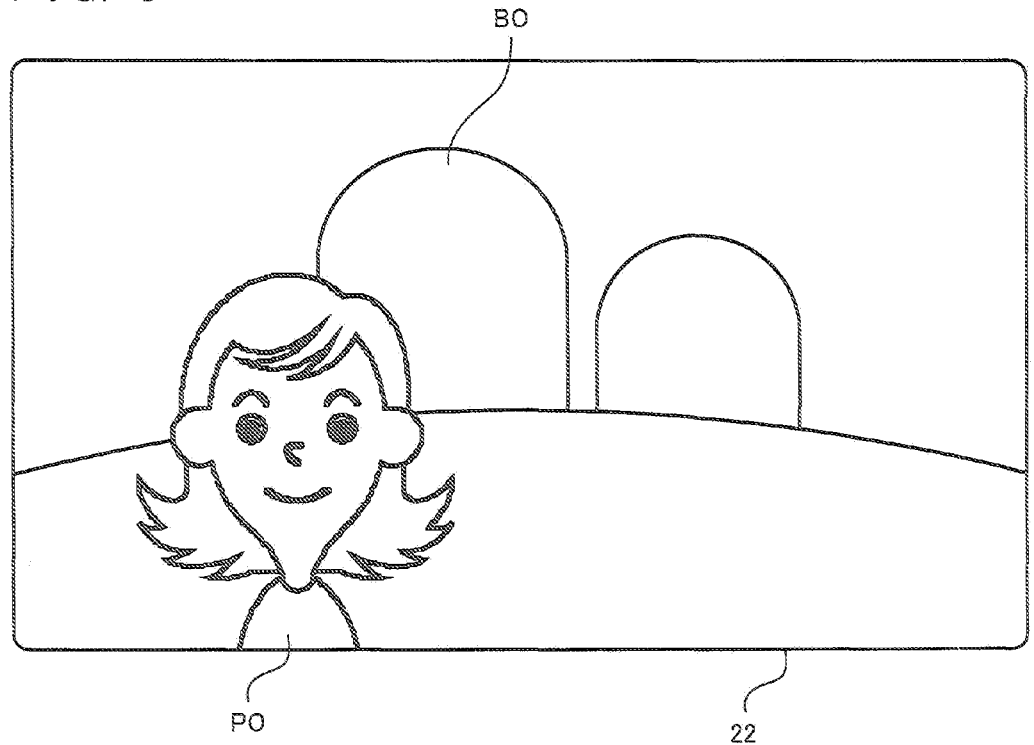
FIG. 5 is a diagram showing a non-limiting example of a display form in which a planar image is displayed on the LCD 22.
Figure 6:
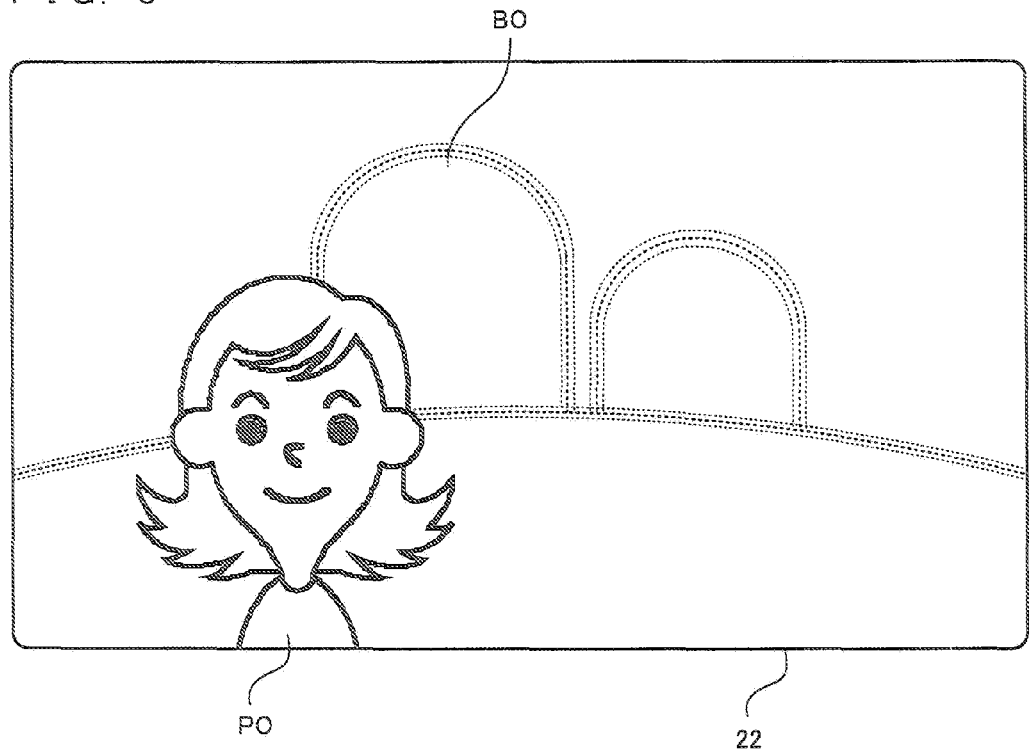
FIG. 6 is a diagram showing a non-limiting example of a display form in which a stereoscopic image is displayed on the LCD 22.
Figure 7:
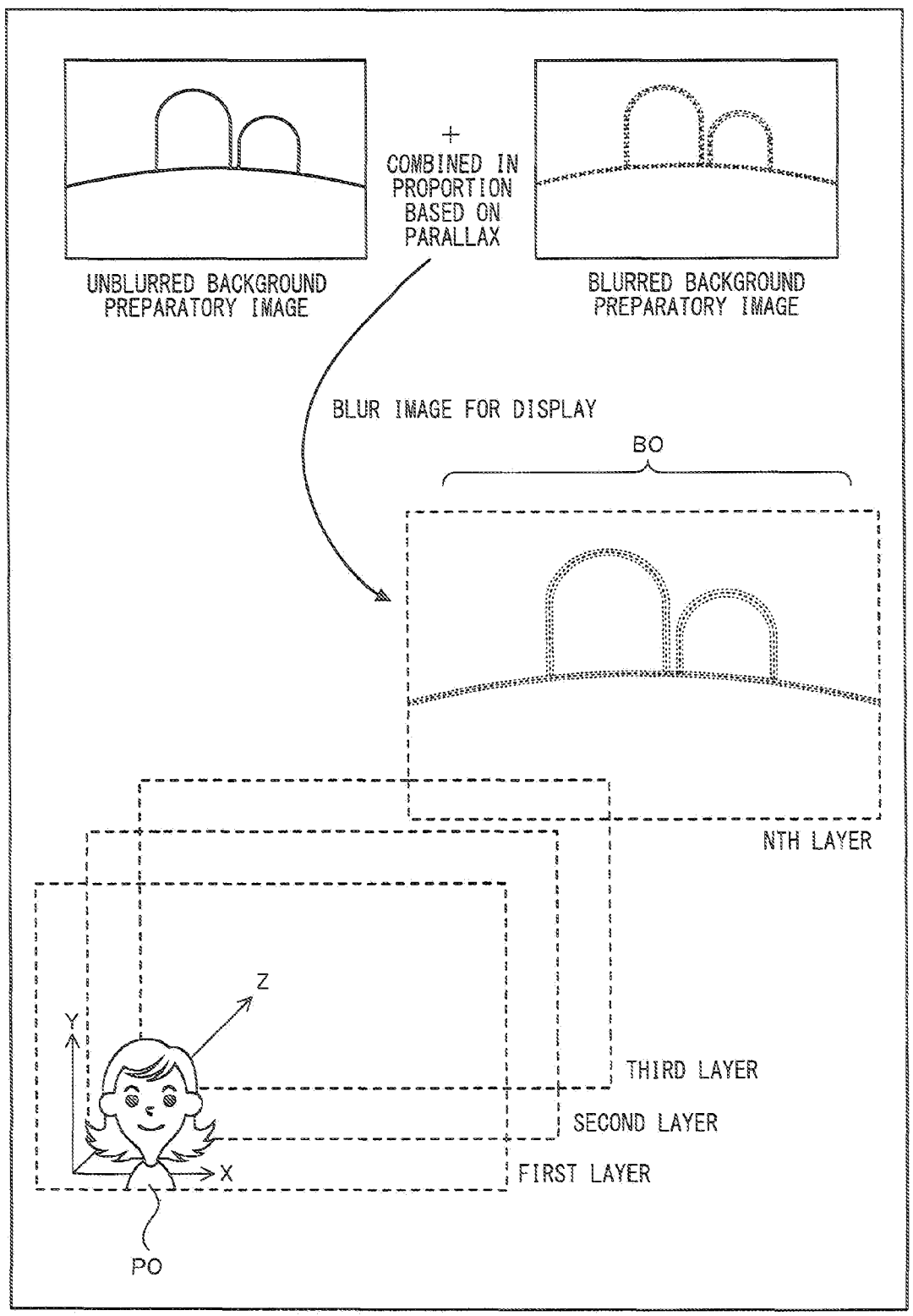
FIG. 7 is a diagram illustrating a non-limiting example of a first stereoscopic image generation method of generating the stereoscopic image.
Figure 8:
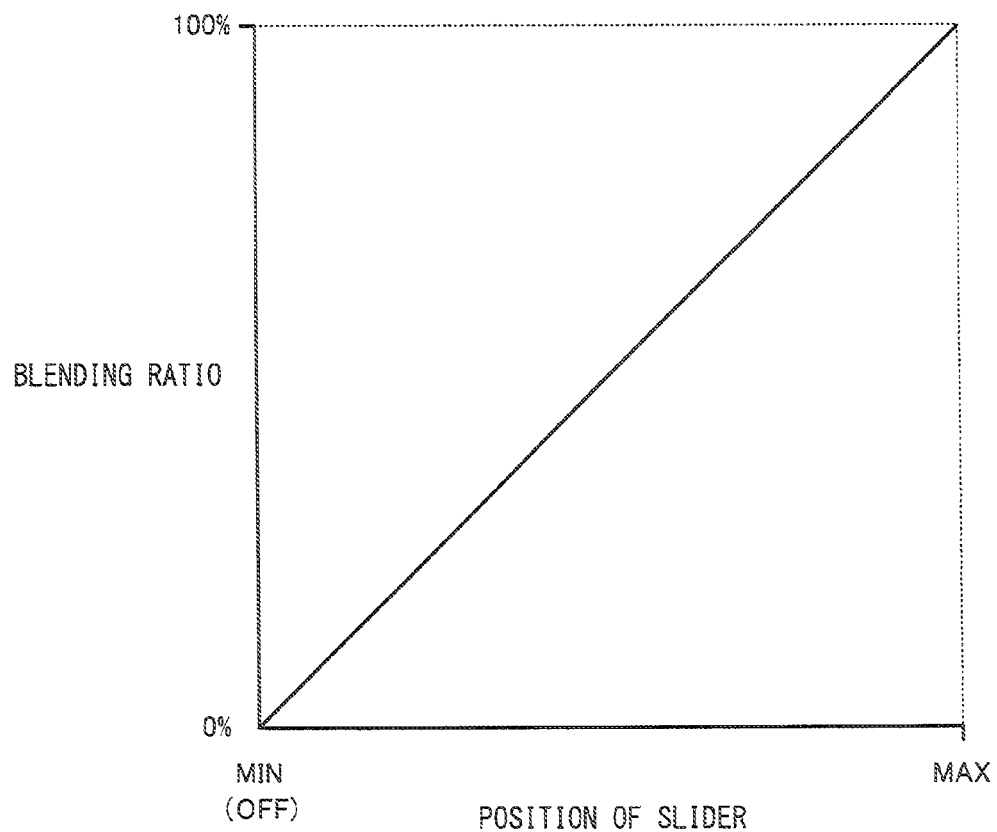
FIG. 8 is a graph showing a non-limiting example of the relationship between the position of a slider of a 3D adjustment switch 25 and a blending ratio.
Figure 9:
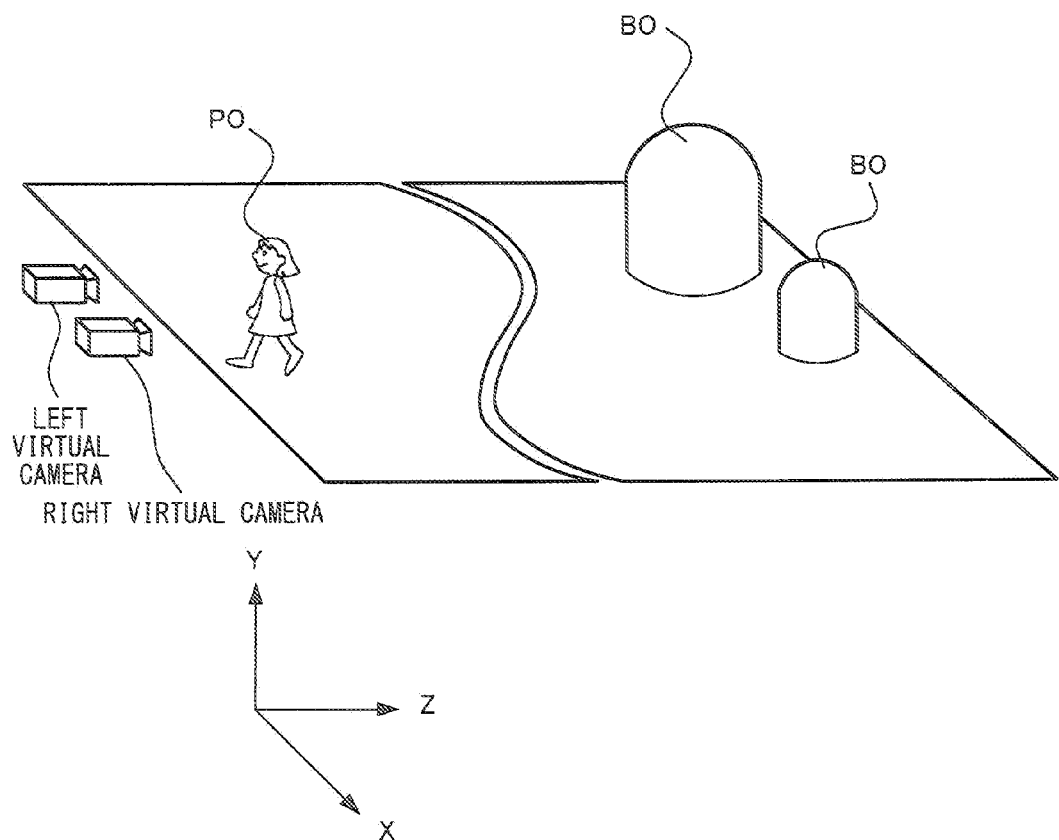
FIG. 9 is a diagram illustrating a non-limiting example of a second stereoscopic image generation method of generating the stereoscopic image.
Figure 10:
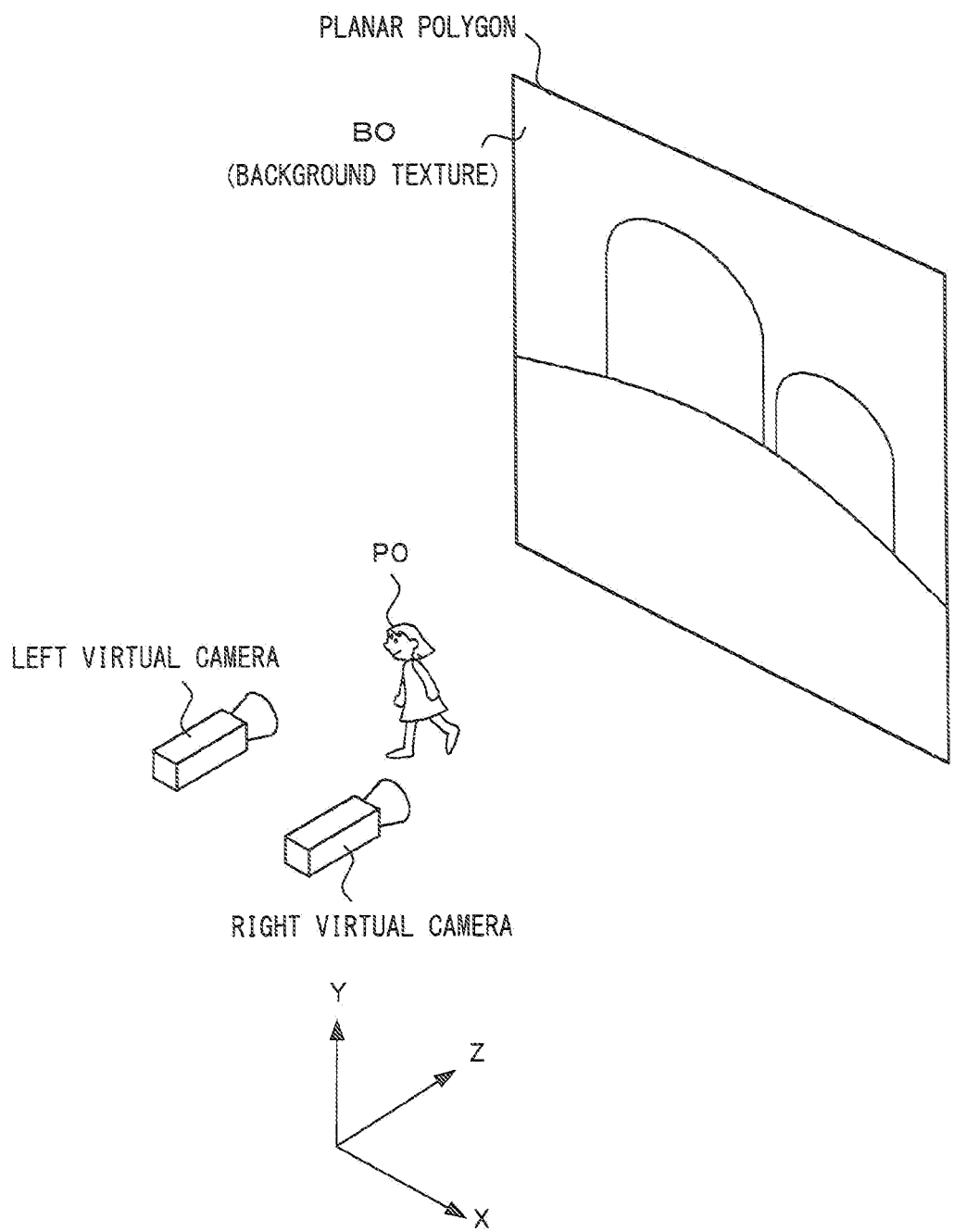
FIG. 10 is a diagram illustrating a non-limiting example of a third stereoscopic image generation method of generating the stereoscopic image.

Next, with reference to FIGS. 3 through 10, examples of the state of use and the display contents of the game apparatus 10 are shown. It should be noted that FIG. 3 is a diagram showing an example of the state of a user operating the game apparatus 10 while holding it. FIG. 4 is a conceptual diagram showing an example of the state of a displayed stereoscopic image. FIG. 5 is a diagram showing an example of a display form in which an image not stereoscopically viewable (a planar image) is displayed on the LCD 22. FIG. 6 is a diagram showing an example of a display form in which a stereoscopically viewable image (a stereoscopic image) is displayed on the LCD 22. FIG. 7 is a diagram illustrating a first stereoscopic image generation method, which is an example of generating the stereoscopic image. FIG. 8 is a graph showing an example of the relationship between the position of the slider of the 3D adjustment switch 25 and a blending ratio. FIG. 9 is a diagram illustrating a second stereoscopic image generation method, which is another example of generating the stereoscopic image. FIG. 10 is a diagram illustrating a third stereoscopic image generation method, which is yet another example of generating the stereoscopic image.

As shown in FIGS. 3 and 4, on the LCD 22, a virtual world image is stereoscopically displayed that represents part of a virtual world including a player object PO. When a stereoscopic image of the virtual world is displayed on the LCD 22, virtual objects appear to be placed at different positions in the depth direction of the stereoscopic image (different depth positions in the virtual world). As an example, in the example of the stereoscopic display shown in FIG. 4, the player object PO appears to be placed near a display screen, and a background object BO appears to be placed at a depth position located behind the player object PO. For example, the player object PO appears to be placed in the virtual world, near a depth position where no parallax is produced on the screen when stereoscopic display is performed (as an example, a depth position where an object appears to be placed at the same depth distance as that of the display screen of the LCD 22, the depth position hereinafter referred to as a "reference depth position"). In contrast, the background object BO appears to be placed in the virtual world at a depth position further from a user's viewpoint than the player object PO is (a depth position where, when stereoscopic display is performed, an object appears to be placed at a position further in the depth direction than the display screen of the LCD 22 is, and the object is displayed so as to have a relatively large parallax).

As shown in FIG. 5, if the planar display mode (the mode where an image is displayed as a planar image) is set on the basis of the operation performed on the 3D adjustment switch 25 by the user, the virtual world is displayed as a planar image on the LCD 22. When the virtual world is displayed as a planar image, the player object PO and the background object BO are each displayed as an unblurred image (an image having a level of blurring, described later, of 0) on the LCD 22. This is because, when displayed in a planar image, displayed objects are all displayed so as to have no parallaxes. In the exemplary embodiment, as will be apparent later, objects having no parallaxes are all displayed as unblurred images.

As shown in FIG. 6, if the three-dimensional display mode (the mode where an image is displayed as a stereoscopic image) is set on the basis of the operation performed on the 3D adjustment switch 25 by the user, the virtual world is displayed as a stereoscopic image on the LCD 22. When the virtual world is displayed as a stereoscopic image, the player object PO is displayed as an unblurred image on the LCD 22. The background object BO, however, is displayed as a blurred image (a triple dashed line indicates a blurred state in the figures) on the LCD 22. In the exemplary embodiment, in accordance with the position of the slider of the 3D adjustment switch 25, display is performed such that the level of blurring an image (the level of blurring) is changed. Consequently, the background object BO is displayed with the level of blurring based on the position of the slider. It should be noted that the player object PO is not a target of the blurring effect, and therefore is displayed as an unblurred image (an image having a level of blurring of 0) on the LCD 22. Thus, when a stereoscopic image is displayed, the level of blurring is changed in accordance with the position of the slider of the 3D adjustment switch 25. This makes it possible to display an image as if the focus on the displayed virtual world is adjusted to a predetermined depth distance (for example, near the reference depth position), which makes it possible to emphasize the sense of perspective in the stereoscopic image.

Here, as described above, it is possible to adjust the parallax of the stereoscopically viewable image (the three-dimensional image) displayed on the LCD 22, by sliding the slider of the 3D adjustment switch 25 in a predetermined direction. In the exemplary embodiment, in accordance with the position of the slider of the 3D adjustment switch 25, the parallax between the right-eye image and the left-eye image is adjusted, while the blurred representation (the focus) of an image placed at a predetermined distance in a depth direction is also adjusted. Specifically, if the slider of the 3D adjustment switch 25 is set at the position corresponding to the planar display mode, the parallax of the background object BO placed at the position furthest from the reference depth position is adjusted to 0, so that the background object BO is displayed as an unblurred image (an image having a level of blurring of 0) on the LCD 22. Then, when the slider of the 3D adjustment switch 25 is moved in the direction of increasing the parallax from the position corresponding to the planar display mode, the parallax of the background object BO is adjusted so as to gradually increase. Additionally, display is performed on the LCD 22 such that also the level of blurring of the background object BO gradually increases in accordance with the position of the slider. The level of blurring is thus adjusted in conjunction with the parallax adjustment made on the basis of the position of the slider of the 3D adjustment switch 25. This makes it possible to provide a feeling as if adjusting the focus of a camera and the depth of field using the 3D adjustment switch 25, which makes it possible to display the stereoscopic image in which the sense of perspective is further emphasized.

Next, a first stereoscopic image generation method is described as an example of generating the stereoscopic image described above representing the virtual world. It should be noted that the example of FIG. 7 shows a coordinate system where: the depth direction in the virtual world displayed on the LCD 22 is a Z-axis direction; the left-right direction is an X-axis direction; and the up-down direction is a Y-axis direction. As shown in FIG. 7, virtual objects are drawn on layers (images) set on XY planes arranged at gradual depth distances from the reference depth position in the depth direction (the positive Z-axis direction shown in FIG. 7).

Then, when the virtual objects drawn on the plurality of layers are displayed, a left-eye virtual world image (a left virtual world image) and a right-eye virtual world image (a right virtual world image) are generated on the basis of the depth distances of the respective layers. For example, the parallaxes (the amounts of shift) of the respective layers are calculated on the basis of both a parallax setting value calculated in accordance with the position of the slider of the 3D adjustment switch 25 and the depth distances of the respective layers from the reference depth position.

As an example, the parallaxes (the amounts of shift) of the respective layers are determined as follows: the parallaxes (the amounts of shift) of the respective layers are set such that, with the parallax (the amount of shift) at a reference depth distance being 0, the parallaxes (the amounts of shift) of the respective layers have a predetermined relationship with (for example, are directly proportional to) the differences in distance between the depth distances of the respective layers and the reference depth distance; and each of the parallaxes (the amounts of shift) is multiplied by a coefficient corresponding to the parallax setting value. Then, the layers are shifted to the left or right (in the negative X-axis direction or the positive X-axis direction shown FIG. 7) by the determined parallaxes (the determined amounts of shift), and the shifted layers are combined together in a superimposed manner such that the shorter the depth distance of the layer, the higher the priority of the image, whereby the left virtual world image and the right virtual world image are generated.

Here, a two-dimensional image of the background object BO is drawn on a layer (for example, an Nth layer) with the level of blurring based on the position of the slider of the 3D adjustment switch 25. As an example, the two-dimensional display image for displaying the background object BO is generated by, in a blending ratio based on the position of the slider of the 3D adjustment switch 25, combining (for example, using alpha compositing) a background image prepared in advance in which the background object BO is blurred (an image in which the background object BO is blurred to a relatively large degree; a blurred background preparatory image), with a background image prepared in advance in which the background object BO is unblurred (an unblurred background preparatory image).

For example, as shown in FIG. 8, the position of the slider of the 3D adjustment switch 25 and the blending ratio are set so as to have a linear relationship (for example, a proportional relationship). As an example, the slider of the 3D adjustment switch 25 can be moved from the position (hereinafter defined as a "MIN position") of setting the parallaxes of all the images displayed on the LCD 22 to 0 and setting the three-dimensional display mode to OFF (that is, the planar display mode) to the position (hereinafter defined as a "MAX position") of adjusting the parallaxes so as to be largest in the three-dimensional display mode. Then, in accordance with the movement of the slider of the 3D adjustment switch 25 from the MIN position to the MAX position as a result of the operation performed on the slider, the blending ratio changes linearly from 0% to 100%. Here, the blending ratio indicates the proportion at which the blurred background preparatory image is combined with the unblurred background preparatory image. A blending ratio of a % indicates that the unblurred background preparatory image having an opacity of (100-a) % and the blurred background preparatory image having an opacity of a % are combined together using alpha compositing. The unblurred preparatory image and the blurred preparatory image are thus prepared in advance and combined together in the blending ratio based on the position of the slider, to generate a blurred display image (a blurred image generated by thus combining the preparatory images together is referred to as a "blur image" in the specification). This eliminates the need to sequentially generate images different from each other in the state of blurring, which makes it possible to reduce the processing load required to generate a blur image. Further, it is also possible to optionally adjust the state of blurring depending on the object, by adjusting the blurred representation of the blurred preparatory image prepared in advance, which makes it possible to generate a variety of blur images without adjusting the combination process per se.

Here, as described above, the parallaxes (the amounts of shift) of the respective layers are adjusted on the basis of the position of the slider of the 3D adjustment switch 25. Thus, it can also be considered that the levels of blurring described above change in accordance with the adjusted parallaxes. That is, if a two-dimensional display image of the background object BO is drawn on the Nth layer, the two-dimensional display image is drawn on the Nth layer with the level of blurring based on the parallax (the amount of shift) set on the Nth layer. It should be noted that if the stereoscopic effect (the parallax) of a three-dimensional image displayed on the LCD 22 is adjusted on the basis of an event other than a user operation using the 3D adjustment switch 25 or the like, objects may be displayed with the levels of blurring based on the parallax adjustment thus made. For example, if, in accordance with the progression of the game, the CPU 311 automatically changes a display image to be displayed on the LCD 22 from a planar image to a stereoscopically viewable image, and, during the change, gradually changes the parallaxes of images to be displayed on the LCD 22 in accordance with the respective depth distances, the level of blurring of the display image to be displayed may be changed in accordance with the changes in the parallaxes of the images. That is, in the exemplary embodiment, even if the depth distance (the Z value) of a virtual object does not change, it is possible to display the virtual object by changing the level of blurring thereof in accordance with a change in the parallax of the virtual object as a result of the operation performed by the user or processing.

It should be noted that, generally, if an image captured using a real camera is blurred, the captured image is likely to result in a relatively bright image because of the variation of the state of the light reaching the film and a wide distribution of the luminance of the captured image. Thus, to realistically represent the blurred image obtained using the real camera, a blurred preparatory image may be generated such that the entire blurred preparatory image has a relatively high luminance. Further, the blurred preparatory image may be entirely blurred, or may be partially blurred (for example, part of the background object BO may be blurred). Further, two preparatory images to be combined together in order to generate a blur image may each be an image in which the virtual object to be displayed (for example, the background object BO) is blurred, so long as the two preparatory images are images different in the state of blurring. In the exemplary embodiment, a blur image may be generated by combining a first image and a second image together, the first image unblurred relative to the virtual object or blurred relative to at least part of the virtual object to a relatively small degree, the second image blurred relative to at least part of the virtual object to a relatively large degree. Further, a plurality of images (the second image and a third image) may be combined with the first image in accordance with the position of the slider, the plurality of images represented so as to be blurred in different manners (being different in the extent of blurring). For example, the first image and the second image may be combined together with a set blending ratio when the position of the slider is placed between the MIN position and the middle position between the MIN position and the MAX position; and the first image and the third image may be combined together with a set blending ratio when the position of the slider is placed between the middle position and the MAX position.

In addition, in the example of FIG. 8, the position of the slider of the 3D adjustment switch 25 and the blending ratio have a linear relationship, but may be set so as to have another type of relationship. For example, the position of the slider of the 3D adjustment switch 25 and the blending ratio may not necessarily have a linear relationship, and may have a curved relationship, such as a quadratic curve or a cubic curve, where the amount of change in the blending ratio gradually increases or where the amount of change in the blending ratio gradually decreases, or may have a stepwise and linear relationship.

In the above description, an image for which a blur image is to be generated is drawn on the layer (the Nth layer) to be displayed at the furthest position in the depth direction from the reference depth position when the virtual world is stereoscopically displayed. Alternatively, the image may be drawn on another layer, or images for which blur images are to be generated may be drawn on a plurality of layers. The blurred image generation process described above may be performed on each layer on which an image for which a blur image is to be generated has been drawn, whereby it is possible to display an image placed at any depth distance by performing a similar blurring process on the image.

In addition, in the example described above, the blurring process is performed on an image drawn on a layer (for example, the Nth layer) placed at a position further in the depth direction (a position where, when displayed on the LCD 22, an object appears to be placed at a position further in the depth direction than the display screen as viewed from the user) than the reference depth position where no parallax is produced when stereoscopic display is performed (a position where the depth position is the position of the screen when display is performed on the LCD 22). Alternatively, a similar blurring process may be performed on an image drawn on a layer placed at a position closer in the depth direction (a position where, when displayed on the LCD 22, an object appears to be placed at a position closer in the depth direction than the screen as viewed from the user). Also in this case, an image is displayed so as to blur an image closer than a position of the depth distance where an object is displayed so as to have a parallax of 0 (for example, the reference depth position). This makes it possible to display an image as if the focus is adjusted to the position of the depth distance in a similar manner, which makes it possible to emphasize the sense of perspective in the stereoscopic image. It should be noted that in the exemplary embodiment, it is also possible to perform a similar blurring process on an image drawn on a layer placed at the reference depth position where no parallax is produced when stereoscopic display is performed.

Next, a second stereoscopic image generation method is described as another example of generating the stereoscopic image described above representing the virtual world. As shown in FIG. 9, the virtual objects are placed in a virtual space defined by a predetermined coordinate system (for example, a world coordinate system). It should be noted that, to make the description more specific, the example of FIG. 9 shows a camera coordinate system where: two virtual cameras (a left virtual camera and a right virtual camera) are placed in the virtual space; the direction of the line of sight of the virtual cameras is a positive Z-axis direction; the right direction of the virtual cameras when directed in the positive Z-axis direction is a positive X-axis direction; and the up direction of the virtual cameras is a positive Y-axis direction. Then, the left virtual camera and the right virtual camera are separate from each other at an inter-camera distance calculated in accordance with the position of the slider of the 3D adjustment switch 25, and are each placed in the virtual space so as to be directed in a direction based on the camera coordinate system described above. Specifically, the inter-camera distance is set to 0 when the position of the slider of the 3D adjustment switch 25 is the MIN position described above, and the inter-camera distance is set such that the closer the position of the slider is to the MAX position, the longer the inter-camera distance. It should be noted that, generally, the virtual space is defined by a world coordinate system. To describe the relationships among the virtual objects and the virtual cameras placed in the virtual space, however, positions in the virtual space are described using the camera coordinate system.

In the virtual space, the player object PO is placed near a position of the reference depth distance from each of the left virtual camera and the right virtual camera. Then, the player object PO moves in accordance with a user operation such that the movement range of the player object PO is the view volume of the left virtual camera and the right virtual camera. Meanwhile, the background object BO is placed in the virtual space at a position further from the left virtual camera and the right virtual camera than the player object PO is.

Using the virtual space thus set, a left-eye virtual world image (a left virtual world image) is generated so as to represent the virtual space viewed from the left virtual camera, and a right-eye virtual world image (a right virtual world image) is generated so as to represent the virtual space viewed from the right virtual camera. Then, the generated left virtual world image and right virtual world image are displayed on the LCD 22, whereby the stereoscopic image of the virtual world is displayed on the LCD 22.

Here, in the exemplary embodiment, a classification is made between a virtual object to be subjected to the blurring process described above (a process target object) and a virtual object not to be subjected to the blurring process (a non-process object). For example, a virtual object placed in an area included within a predetermined depth distance (for example, an area included within a predetermined distance in a front-rear direction symmetrical with respect to the position of the reference depth distance) from the left virtual camera and the right virtual camera (the Z-axis direction shown in FIG. 9) is defined as a non-process object, and other virtual objects are defined as process target objects. Then, a virtual space from which the process target objects are excluded is generated, so that the virtual space viewed from the left virtual camera is generated as a left-eye non-process image, and the virtual space viewed from the right virtual camera is generated as a right-eye non-process image.

In addition, a virtual space from which the non-process object is excluded is generated, so that the virtual space viewed from the left virtual camera is generated as a left-eye blurring process image (a left blurring process image), and the virtual space viewed from the right virtual camera is generated as a right-eye blurring process image (a right blurring process image). Subsequently, a blurring process is performed on the left blurring process image and the right blurring process image using any method, to obtain a left blurred image and a right blurred image. Then, in a similar manner to the combination method in the first stereoscopic image generation method, the left blurring process image and the left blurred image are combined together, and the right blurring process image and the right blurred image are combined together. That is, in the blending ratio based on the position of the slider of the 3D adjustment switch 25, the left blurred image is combined (for example, using alpha compositing) with the left blurring process image, and the right blurred image is combined with the right blurring process image.

Then, a left virtual world image is generated by combining the left-eye non-process image with the left blurring process image subjected to the combination process, in a superimposed manner such that the left-eye non-process image has priority. Further, a right virtual world image is generated by combining the right-eye non-process image with the right blurring process image subjected to the combination process, in a superimposed manner such that the right-eye non-process image has priority. The left virtual world image and the right virtual world image thus generated are displayed on the LCD 22, whereby a stereoscopic image subjected to a blurring process in a similar manner to the first stereoscopic image generation method is displayed on the LCD 22.

Next, a third stereoscopic image generation method is described as another example of generating the stereoscopic image described above representing the virtual world. As shown in FIG. 10, the virtual objects are placed in a virtual space defined by a predetermined coordinate system (for example, a world coordinate system). It should be noted that also in the example of FIG. 10, a left virtual camera and a right virtual camera are placed in the virtual space so as to be separate from each other at a distance based on the position of the slider of the 3D adjustment switch 25. Further, a camera coordinate system similar to that of the second stereoscopic image generation method is defined.

In the virtual space, the player object PO is placed near a position of the reference depth distance from each of the left virtual camera and the right virtual camera. Then, the player object PO moves in accordance with a user operation such that the movement range of the player object PO is the view volume of the left virtual camera and the right virtual camera. Meanwhile, the background object BO, as a planar polygon to which a background texture is applied, is placed in the virtual space at a position further from the left virtual camera and the right virtual camera than the player object PO is. It should be noted that the planar polygon to which the background texture is applied is placed in the virtual space such that the front surface of the planar polygon is perpendicular to the line of sight of the left virtual camera and the right virtual camera.

The background texture is an image subjected to a blurring process similar to that of the first stereoscopic image generation method. That is, an unblurred two-dimensional preparatory image of the background object BO and a blurred two-dimensional preparatory image of the background object BO are prepared in advance. Then, the background texture to be applied to the planar polygon is generated by, in the blending ratio based on the position of the slider of the 3D adjustment switch 25, combining (for example, using alpha compositing) the blurred two-dimensional preparatory image with the unblurred two-dimensional preparatory image.

Then, a left virtual world image is generated so as to represent the player object PO viewed from the left virtual camera and the planar polygon to which the background texture is applied (the background object BO), and a right virtual world image is generated so as to represent the player object PO viewed from the right virtual camera and the planar polygon. Then, the generated left virtual world image and right virtual world image are displayed on the LCD 22, whereby a stereoscopic image subjected to a blurring process in a similar manner to the first stereoscopic image generation method and the second stereoscopic image generation method is displayed on the LCD 22.

It should be noted that in the first through third stereoscopic image generation methods described above, a blur image for display is generated by combining a blurred image with an unblurred image in the blending ratio based on the position of the slider of the 3D adjustment switch 25. Alternatively, a blur image may be generated without performing such a combination process. For example, every time the process of displaying the background object BO is performed, a blurred image for display may be sequentially generated with the level of blurring based on the position of the slider of the 3D adjustment switch 25, and the generated blurred image may be displayed as it is on the LCD 22 as a blur image for display. Specifically, in the case of the second stereoscopic image generation method, when a left blurred image and a right blurred image are generated, a blurring process is performed on a left blurring process image and a right blurring process image with the level of blurring based on the position of the slider of the 3D adjustment switch 25. Then, a left virtual world image is generated by combining a left-eye non-process image with the left blurring process image subjected to the blurring process, in a superimposed manner such that the left-eye non-process image has priority; and a right virtual world image is generated by combining a right-eye non-process image with the right blurring process image subjected to the blurring process, in a superimposed manner such that the right-eye non-process image has priority. Such an image processing method also makes it possible to display on the LCD 22 a stereoscopic image subjected to a similar blurring process.

In addition, in the first and third stereoscopic image generation methods described above, the virtual object to be subjected to the blurring process is represented as a two-dimensional image placed on a plane perpendicular to the direction of the line of sight. Alternatively, the virtual object may be represented as an image placed on a surface of another shape, or as an image placed on a plane directed in another direction. For example, the virtual object to be subjected to the blurring process may be represented so as to be placed on a curved surface or a spherical surface. The virtual object to be subjected to the blurring process may be placed on a plane inclined relative to a direction perpendicular to the direction of the line of sight.

Figure 11:
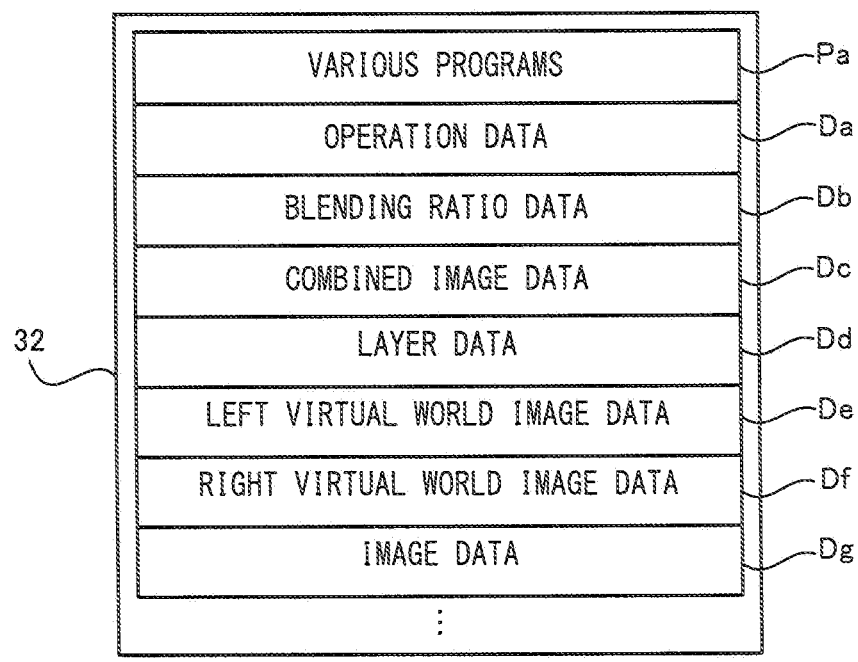
FIG. 11 is a diagram showing a non-limiting example of various data stored in a main memory 32 in accordance with the execution of a display control program.
Figure 12:
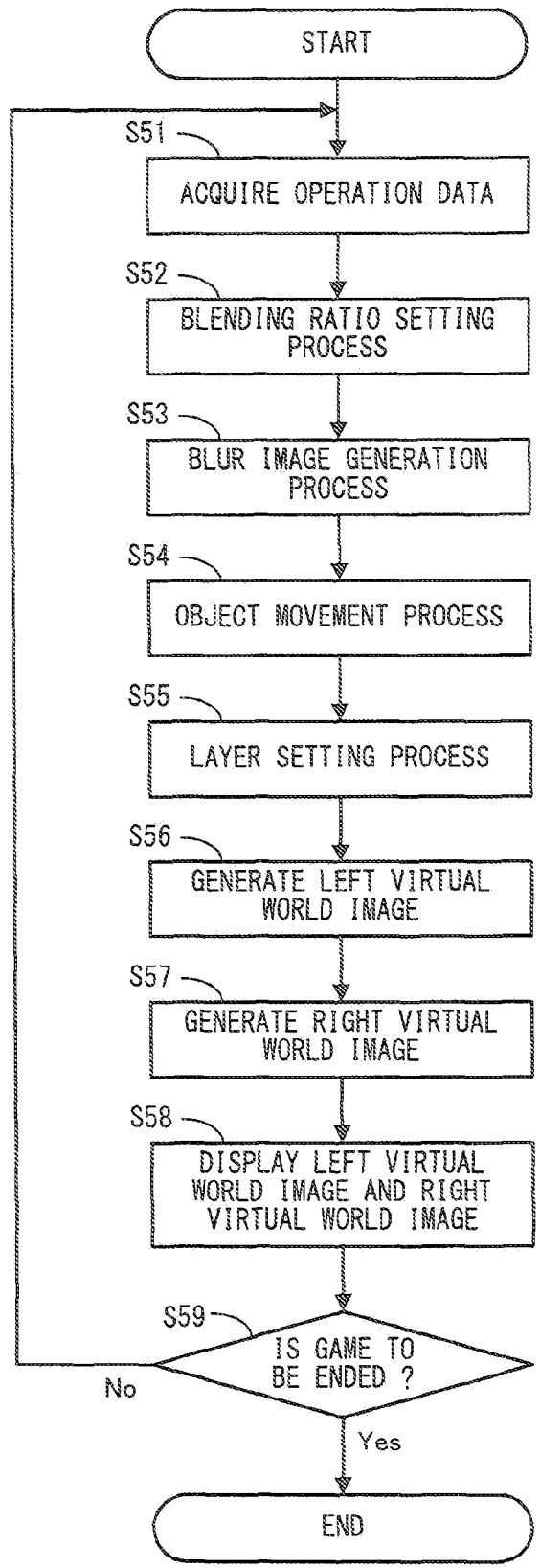
FIG. 12 is a flow chart showing a non-limiting example of the operation of the game apparatus 10 performing a display control process in accordance with the execution of the display control program.

Next, with reference to FIGS. 11 and 12, a description is given of a specific processing operation based on the display control program to be executed by the game apparatus 10. It should be noted that FIG. 11 is a diagram showing an example of various data stored in the main memory 32 in accordance with the execution of the display control program. FIG. 12 is a flow chart showing an example of the operation of the game apparatus 10 performing a display control process in accordance with the execution of the display control program. It should be noted that programs for performing these processes are included in a memory built into the game apparatus 10 (for example, the data storage internal memory 35) or in the external memory 45. When the game apparatus 10 is turned on, the programs are read from the built-in memory, or read from the external memory 45 via the external memory I/F 33, to the main memory 32, and are then executed by the CPU 311. Further, in the display control process described later, a description is given of the case where a stereoscopic image is generated using the first stereoscopic image generation method.

Referring to FIG. 11, the main memory 32 stores programs read from the built-in memory or the external memory 45, and temporary data generated in the display control process. Referring to FIG. 11, the following are stored in the data storage area of the main memory 32: operation data Da; blending ratio data Db; combined image data Dc; layer data Dd; left virtual world image data De; right virtual world image data Df; image data Dg; and the like. Further, in the program storage area of the main memory 32, various programs Pa included in the display control program are stored.

The operation data Da is data representing operation information regarding the operations performed on the game apparatus 10 by the user. For example, the operation data Da includes data indicating that the user has operated an input apparatus of the game apparatus 10, such as the operation section 14 or the 3D adjustment switch 25. The operation data from each of the operation section 14 and the 3D adjustment switch 25 is stored in the operation data Da and updated.

The blending ratio data Db is data representing the blending ratio set in accordance with the position of the slider of the 3D adjustment switch 25. The combined image data Dc is combined image data of a combined image obtained by, in accordance with the set blending ratio, combining an unblurred preparatory image and a blurred preparatory image prepared in advance. The layer data Dd is data representing layers generated at depth distances and the relative placement relationships among the generated layers.

The left virtual world image data De is left virtual world image data of a left virtual world image generated on the basis of the parallaxes (the amounts of shift) of the respective layers calculated in accordance with the position of the slider of the 3D adjustment switch 25. The right virtual world image data Df is right virtual world image data of a right virtual world image generated on the basis of the parallaxes (the amounts of shift) of the respective layers calculated in accordance with the position of the slider of the 3D adjustment switch 25.

The image data Dg is image data for generating each layer, and includes image data representing virtual objects such as the player object PO and the background object BO. The image data Dg also includes data of a pair of images (an unblurred preparatory image and a blurred preparatory image) for generating a blur image for display described above.

Next, with reference to FIG. 12, the operation of the information processing section 31 is described. First, when the game apparatus 10 is turned on, the CPU 311 executes a boot program (not shown), thereby loading a program stored in the built-in memory or the external memory 45 into the main memory 32. Then, the information processing section 31 (the CPU 311) executes the loaded program, thereby performing the steps (abbreviated as "S") shown in FIG. 12. It should be noted that in FIG. 12, the descriptions of the processes not directly related to the exemplary embodiment are omitted. Further, in the exemplary embodiment, descriptions are given on the assumption that the CPU 311 performs the processes of all the steps in the flow chart of FIG. 12. Alternatively, a processor or a dedicated circuit other than the CPU 311 may perform the processes of some of the steps in the flow chart of FIG. 12.

Referring to FIG. 12, the CPU 311 acquires operation data (step 51), and proceeds to the subsequent step. For example, the CPU 311 acquires data representing the operations performed on the operation section 14 and the 3D adjustment switch 25, and updates the operation data Da.

Next, the CPU 311 sets the blending ratio (step 52), and proceeds to the subsequent step. For example, the 3D adjustment switch 25 outputs data representing the position of the slider in each predetermined cycle, so that the CPU 311 calculates the blending ratio in said each predetermined cycle on the basis of the operation data Da including the data output from the 3D adjustment switch 25. Specifically, on the basis of the relationship set in advance between the position of the slider of the 3D adjustment switch 25 and the blending ratio (see FIG. 8, for example), the CPU 311 sets a blending ratio corresponding to the most recent position of the slider stored in the operation data Da, and updates the blending ratio data Db using the set blending ratio.

Next, the CPU 311 generates a blur image for display based on the blending ratio set in the above step 52 (step 53), and proceeds to the subsequent step. For example, the CPU 311 extracts from the image data Dg a pair of images (an unblurred preparatory image and a blurred preparatory image) used to generate a layer on which the level of blurring is to be changed, and generates a blur image for display by combining the preparatory images together in accordance with the blending ratio. It should be noted that the method of generating the blur image of which the level of blurring is to be changed is similar to the generation method described with reference to FIGS. 7 and 8, and therefore is not described in detail here.

Next, the CPU 311 performs an object movement process (step 54), and proceeds to the subsequent step. For example, the CPU 311 acquires operation data, stored in the operation data Da, of the most recent operation performed on the operation section 14, and causes the player object PO to take action and move in accordance with the content of the operation represented by the operation data. Here, typically, the player object PO moves within a layer in which the player object PO can move, in accordance with the content of the operation. Alternatively, the player object PO may move to another layer in accordance with the content of the operation.

Next, the CPU 311 sets layers (step 55), and proceeds to the subsequent step. For example, the CPU 311 generates layers by drawing virtual objects on layers set on XY planes arranged at gradual depth distances in the depth direction, and updates the layer data Dd using the generated layers. As an example, the CPU 311 generates a layer on which the player object PO is to be placed, by drawing on the layer the player object PO in accordance with the action and the position set in the above step 54. Further, the CPU 311 generates a layer on which an image is to be drawn by changing the level of blurring thereof, by drawing on the layer the blur image for display generated in the above step 53 (the image represented by the combined image data Dc).

Next, the CPU 311 generates a left virtual world image using the layers set in the above step 55 (step 56), and proceeds to the subsequent step. For example, the CPU 311 determines the amounts of shift of the respective layers as follows: the CPU 311 sets the amounts of shift by which the layers set in the above step 55 are to be placed so as to be shifted when stereoscopic display is performed, such that, with the amount of shift at the reference depth distance being 0, the amounts of shift are, for example, directly proportional to the differences in distance between the depth distances of the respective layers and the reference depth distance; and the CPU 311 multiplies each of the amounts of shift by a coefficient corresponding to the parallax setting value based on the position of the slider of the 3D adjustment switch 25. Then, the CPU 311 places the layers set in the layer data Dd, so as to shift the layers placed at depth distances longer than the reference depth distance to the left by the amounts of shift set for the respective layers, and so as to shift the layers placed at depth distances shorter than the reference depth distance to the right by the amounts of shift set for the respective layers. Then, the CPU 311 generates a left virtual world image by combining the shifted layers together in a superimposed manner such that the shorter the depth distance of the layer, the higher the priority of the image. Then, on the basis of the position of the player object PO, a user operation, and the like, the CPU 311 sets in the generated left virtual world image a display range to be displayed on the LCD 22, and updates the left virtual world image data De using the image included in the display range.

Next, the CPU 311 generates a right virtual world image using the layers set in the above step 55 (step 57), and proceeds to the subsequent step. For example, the CPU 311 places the layers set in the layer data Dd, so as to shift the layers placed at depth distances longer than the reference depth distance to the right by the amounts of shift set for the respective layers, and so as to shift the layers placed at depth distances shorter than the reference depth distance to the left by the amounts of shift set for the respective layers. Then, the CPU 311 generates a right virtual world image by combining the shifted layers together in a superimposed manner such that the shorter the depth distance of the layer, the higher the priority of the image. Then, on the basis of the position of the player object PO, a user operation, and the like, the CPU 311 sets in the generated right virtual world image a display range to be displayed on the LCD 22, and updates the right virtual world image data Df using the image included in the display range. It should be noted that the display range of the right virtual world image at the reference depth distance is the same as the display range of the left virtual world image at the reference depth distance, and the amounts of shift of the left virtual world image and the right virtual world image are both 0. Thus, the left virtual world image and the right virtual world image in the display ranges at the reference depth distance result in the same image.

Next, the CPU 311 displays a stereoscopic image on the LCD 22 such that the left virtual world image set in the left virtual world image data De is a left-eye image, and the right virtual world image set in the right virtual world image data Df is a right-eye image (step 58), and proceeds to the subsequent step.

Next, the CPU 311 determines whether or not to end the game (step 59). Examples of conditions for ending the game include: the satisfaction of the conditions under which the game is over; the satisfaction of the conditions under which the game is completed; and the fact that the user has performed the operation of ending the game. If the game is not to be ended, the CPU 311 returns to the above step 51, and repeats the process thereof. If, on the other hand, the game is to be ended, the CPU 311 ends the processing indicated in the flow chart.

As described above, in the display control process according to the above exemplary embodiment, even if the depth distance (the Z value) of a virtual object does not change, it is possible to display the virtual object by changing the level of blurring thereof in accordance with a change in the parallax of the virtual object as a result of the operation performed by the user or processing. Further, the level of blurring is adjusted in conjunction with the parallax adjustment made on the basis of the position of the slider of the 3D adjustment switch 25. This makes it possible to provide a feeling as if adjusting the focus of a camera (the depth of field) using the 3D adjustment switch 25, which makes it possible to display an image in which the stereoscopic effect is further emphasized.

In addition, in the exemplary embodiment, the descriptions are given using the handheld game apparatus 10. Alternatively, the exemplary embodiment may be achieved by executing the display control program according to the exemplary embodiment using an information processing apparatus such as a stationary game apparatus or a general personal computer. Further, in another exemplary embodiment, not only a game apparatus but also any handheld electronic device may be used, such as a PDA (Personal Digital Assistant), a mobile phone, a personal computer, or a camera.

In addition, the above descriptions are given using the example where the game apparatus 10 performs the display control process. Alternatively, another apparatus may perform at least some of the processing steps of the display control process. For example, if the game apparatus 10 is configured to communicate with another apparatus (for example, a server or another game apparatus), the game apparatus 10 and said another apparatus may cooperate to perform the processing steps of the display control process. As a possible example, the game apparatus 10 may transmit operation data to another apparatus, and the game apparatus 10 may receive a left virtual world image and a right virtual world image generated by said another apparatus. Then, the game apparatus 10 may perform the process of stereoscopically displaying the received images on the LCD 22. Another apparatus may thus perform at least some of the processing steps, which enables a display control process similar to that described above. The display control process described above can be performed by a processor or the cooperation of a plurality of processors, the processor and the plurality of processors contained in an information processing system including at least one information processing apparatus. Further, in the exemplary embodiment, the processing indicated in the flow chart described above is performed as a result of the information processing section 31 of the game apparatus 10 executing a predetermined program. Alternatively, some or all of the processing indicated in the flow chart may be performed by a dedicated circuit included in the game apparatus 10.

In addition, the shape of the game apparatus 10 described above, and the shapes, the numbers, the installation positions, and the like of the operation section 14 and the 3D adjustment switch 25 provided in the game apparatus 10 are merely illustrative. Thus, it is needless to say that the exemplary embodiment can be achieved also with other shapes, other numbers, and other installation positions. Further, the processing orders, the setting values, the values used in the determinations, and the like that are used in the display control process described above are merely illustrative. Thus, it is needless to say that the exemplary embodiment can be achieved also with other orders and other values.

In addition, the display control program (the game program) may be supplied to the game apparatus 10 not only through an external storage medium such as the external memory 45, but also through a wired or wireless communication link. Further, the program may be stored in advance in a non-volatile storage device included in the game apparatus 10. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It is needless to say that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

A storage medium having stored therein a display control program, a display control apparatus, a display control system, and a display control method according to the exemplary embodiment can emphasize the sense of depth in a stereoscopically viewable image when displaying it, and are useful as a display control program, a display control apparatus, a display control system, a display control method, and the like that perform the process of displaying various stereoscopic images on a display apparatus.

What is claimed is:

1. A non-transitory computer-readable storage medium having stored therein a display control program to be executed by a computer of a display control apparatus for displaying a predetermined virtual world on a display apparatus capable of performing stereoscopic display, the display control program causing the computer to execute:

acquiring an output based on a parallax adjustment for, in accordance with a user operation, adjusting a parallax with which a stereoscopic image is displayed on the display apparatus;

in accordance with the output based on a parallax adjustment, adjusting a parallax with which the virtual world is stereoscopically displayed, and
(i) if the parallax is adjusted so as to gradually increase, setting a level of blurring with which at least part of the virtual world is stereoscopically displayed, such that the level of blurring gradually increases, and
(ii) if the parallax is adjusted so as to gradually decreases, setting the level of blurring with which at least part of the virtual world is stereoscopically displayed, such that the level of blurring gradually decreases; and generating, on the basis of the parallax, a stereoscopic image in which the virtual world is stereoscopically displayed, by blurring at least part of the virtual world in accordance with the level of blurring set corresponding to the adjusted parallax.

2. The non-transitory computer-readable storage medium having stored therein the display control program according to claim 1, wherein
the parallax with which the virtual world is stereoscopically displayed is allowed to be changed without changing a position of an object in the virtual world, and
the level of blurring is set by changing the level of blurring in accordance with the changed parallax.

3. The non-transitory computer-readable storage medium having stored therein the display control program according to claim 1, wherein
in accordance with the parallax set for a partial region of the virtual world, the level of blurring with which the partial region is displayed is set, and
the stereoscopic image is generated on the basis of the parallax by blurring the partial region in accordance with the level of blurring.

4. The non-transitory computer-readable storage medium having stored therein the display control program according to claim 3, wherein
at least one object included in the virtual world is used as the partial region, and the level of blurring with which the object is displayed is set in accordance with the parallax set for the object, and
the stereoscopic image is generated on the basis of the parallax by blurring the object with which the level of blurring has been set, in accordance with the set level of blurring.

5. The non-transitory computer-readable storage medium having stored therein the display control program according to claim 1, wherein
the level of blurring is set by changing the level of blurring so as to have a linear relationship with a change in the parallax.

6. The non-transitory computer-readable storage medium having stored therein the display control program according to claim 1, wherein
the stereoscopic image is generated on the basis of the parallax by combining a first image and a second image together to blur the combined image, the first image unblurred or blurred in at least part thereof to a relatively small degree, the second image blurred in at least part thereof to a relatively large degree.

7. The non-transitory computer-readable storage medium having stored therein the display control program according to claim 6, wherein
the stereoscopic image is generated on the basis of the parallax by combining the first image and the second image together in a blending ratio based on the level of blurring to blur the combined image.

8. The non-transitory computer-readable storage medium having stored therein the display control program according to claim 6, wherein
an image brighter than the first image is used as the second image.

9. The non-transitory computer-readable storage medium having stored therein the display control program according to claim 4, wherein
the stereoscopic image is generated on the basis of the parallax by combining a first image and a second image together to blur the combined image, the first image unblurred relative to the object with which the level of blurring has been set, or blurred relative to at least part of the object to a relatively small degree, the second image blurred relative to the at least part of the object to a relatively large degree.

10. The non-transitory computer-readable storage medium having stored therein the display control program according to claim 6, wherein
a third image is further used that is blurred in at least part thereof in a different manner from the blurring of the second image and blurred in the at least part thereof to a larger degree than the blurring of the first image, and the second image or the third image is, in accordance with the level of blurring, selected to be combined with the first image.

11. The non-transitory computer-readable storage medium having stored therein the display control program according to claim 3, wherein
the level of blurring with which the partial region is displayed is set using as the partial region a portion displayed in the virtual world at a position further in a depth direction than a reference depth position where no parallax is produced when the virtual world is stereoscopically displayed, and
the stereoscopic image is generated on the basis of the parallax by blurring the partial region with which the level of blurring has been set, in accordance with the set level of blurring.

12. The non-transitory computer-readable storage medium having stored therein the display control program according to claim 11, wherein
the level of blurring with which the partial region is displayed is set using as the partial region a portion to be displayed at the furthest position in the depth direction from the reference depth position when the virtual world is stereoscopically displayed.

13. The non-transitory computer-readable storage medium having stored therein the display control program according to claim 1, wherein
the level of blurring is set for an image to be displayed in the virtual world at a position further in a depth direction than a display screen of the display apparatus when the virtual world is stereoscopically displayed on the display apparatus, and
the stereoscopic image is generated on the basis of the parallax by blurring the image to be displayed at the position further in the depth direction, in accordance with the set level of blurring.

14. The non-transitory computer-readable storage medium having stored therein the display control program according to claim 3, wherein the level of blurring with which the partial region is displayed is set using as the partial region a portion to be displayed in the virtual world at a position closer in a depth direction than a reference depth position where no parallax is produced when the virtual world is stereoscopically displayed, and the stereoscopic image is generated on the basis of the parallax by blurring the partial region with which the level of blurring has been set, in accordance with the set level of blurring.

15. The non-transitory computer-readable storage medium having stored therein the display control program according to claim 1, the display control program further causing the computer to execute placing objects on surfaces arranged at different depth distances in a depth direction in the virtual world, wherein in accordance with the parallax set for an entirety of the object placed on the surface arranged at a predetermined depth distance among the depth distances, the level of blurring with which the object placed on the surface arranged at the predetermined depth distance is displayed is set.

16. The non-transitory computer-readable storage medium having stored therein the display control program according to claim 15, wherein the entirety of the object placed on the surface arranged at the predetermined depth distance is placed as one two-dimensional image perpendicular to the depth direction, and a two-dimensional image in which the object is blurred is generated by combining together a plurality of two-dimensional images in which the object is represented so as to be blurred in different manners, and the stereoscopic image is generated by placing the two-dimensional image including the blurred object on the basis of the parallax.

17. The non-transitory computer-readable storage medium having stored therein the display control program according to claim 1, wherein the parallax adjustment includes an operation of a touch panel of the display apparatus.

18. A display control apparatus for displaying a predetermined virtual world on a display apparatus capable of performing stereoscopic display, the display control apparatus comprising a processor system including at least one processor, the processor system being configured to:

acquire an output from a parallax adjuster for, in accordance with a user operation, adjusting a parallax with which a stereoscopic image is displayed on the display apparatus;

in accordance with the output from the parallax adjuster, adjust a parallax with which the virtual world is stereoscopically displayed, and (i) if the parallax is adjusted so as to gradually increase, set a level of blurring with which at least part of the virtual world is stereoscopically displayed, such that the level of blurring gradually increases, and (ii) if the parallax is adjusted so as to gradually decreases, set the level of blurring with which at least part of the virtual world is stereoscopically displayed, such that the level of blurring gradually decreases; and generate, on the basis of the parallax, a stereoscopic image in which the virtual world is stereoscopically displayed, by blurring at least part of the virtual world in accordance with the level of blurring set corresponding to the adjusted parallax.

19. The display control apparatus according to claim 16, wherein the parallax adjuster includes a touch panel configured to receive user operations.

20. A display control system, including a plurality of apparatuses configured to communicate with each other, for displaying a predetermined virtual world on a display apparatus capable of performing stereoscopic display, the display control system comprising a processor system including at least one processor, the processor system being configured to:

acquire an output from a parallax adjuster for, in accordance with a user operation, adjusting a parallax with which a stereoscopic image is displayed on the display apparatus;

in accordance with the output from the parallax adjuster, adjust a parallax with which the virtual world is stereoscopically displayed, and (i) if the parallax is adjusted so as to gradually increase, set a level of blurring with which at least part of the virtual world is stereoscopically displayed, such that the level of blurring gradually increases, and (ii) if the parallax is adjusted so as to gradually decreases, set the level of blurring with which at least part of the virtual world is stereoscopically displayed, such that the level of blurring gradually decreases; and generate, on the basis of the parallax, a stereoscopic image in which the virtual world is stereoscopically displayed, by blurring at least part of the virtual world in accordance with the level of blurring set corresponding to the adjusted parallax.

21. The display control system according to claim 20, wherein the parallax adjuster includes a touch panel configured to receive user operations.

22. A display control method to be performed by a processor or a cooperation of a plurality of processors, the processor and the plurality of processors contained in a display control system including at least one information processing apparatus capable of controlling display so as to display a predetermined virtual world on a display apparatus capable of performing stereoscopic display, the display control method comprising:

acquiring an output based on a parallax adjustment for, in accordance with a user operation, adjusting a parallax with which a stereoscopic image is displayed on the display apparatus;

in accordance with the output based on a parallax adjustment, adjusting a parallax with which the virtual world is stereoscopically displayed, and (i) if the parallax is adjusted so as to gradually increase, setting a level of blurring with which at least part of the virtual world is stereoscopically displayed, such that the level of blurring gradually increases, and (ii) if the parallax is adjusted so as to gradually decreases, setting the level of blurring with which at least part of the virtual world is stereoscopically displayed, such that the level of blurring gradually decreases; and generating, on the basis of the parallax, a stereoscopic image in which the virtual world is stereoscopically displayed, by blurring at least part of the virtual world in accordance with the level of blurring set corresponding to the adjusted parallax.

23. The display control method according to claim 22, wherein the parallax adjustment includes an operation of a touch panel of the display apparatus.

* * * * *